US010107572B2

(12) United States Patent
Bertilsson et al.

(10) Patent No.: US 10,107,572 B2
(45) Date of Patent: Oct. 23, 2018

(54) PLATE HEAT EXCHANGER

(71) Applicant: ALFA LAVAL CORPORATE AB, Lund (CH)

(72) Inventors: Klas Bertilsson, Eslöv (CH); Anders Nyander, Staffanstorp (CH); Rolf Bermhult, Lund (CH)

(73) Assignee: ALFA LAVALCORPORATE AB, Lund (SE)

( * ) Notice: Subject to any disclaimer, the term of this patent is extended or adjusted under 35 U.S.C. 154(b) by 652 days.

(21) Appl. No.: 14/407,542

(22) PCT Filed: Jun. 11, 2013

(86) PCT No.: PCT/EP2013/061980
§ 371 (c)(1),
(2) Date: Dec. 12, 2014

(87) PCT Pub. No.: WO2013/186192
PCT Pub. Date: Dec. 19, 2013

(65) Prior Publication Data
US 2015/0184954 A1 Jul. 2, 2015

(30) Foreign Application Priority Data

Jun. 14, 2012 (EP) .................................. 12171914

(51) Int. Cl.
*F28F 13/08* (2006.01)
*F25B 39/02* (2006.01)
(Continued)

(52) U.S. Cl.
CPC .............. *F28F 13/08* (2013.01); *B01D 1/221* (2013.01); *F25B 39/022* (2013.01);
(Continued)

(58) Field of Classification Search
CPC ....... F28F 13/08; F25B 39/022; F25B 39/028; B01D 1/221
(Continued)

(56) References Cited

U.S. PATENT DOCUMENTS 2,159,251 A 5/1939 Brizzolara
4,503,908 A 3/1985 Rosman et al.
(Continued)

FOREIGN PATENT DOCUMENTS

CN 1094156 A 10/1994
CN 1892163 A 1/2007
(Continued)

OTHER PUBLICATIONS

Office Action (Notice of Reasons for Rejection) dated Feb. 1, 2016, by the Japanese Patent Office in corresponding Japanese Patent Application No. 2015-516582 (7 pgs).
(Continued)

*Primary Examiner* — Raheena R Malik
(74) *Attorney, Agent, or Firm* — Buchanan Ingersoll & Rooney PC

(57) ABSTRACT

The invention relates to a plate heat exchanger including a plate package, which includes a number of first and second heat exchanger plates which are joined to each other and arranged side by side in such a way that first and second plate interspaces are formed. At least two injectors are provided, each injector being arranged to supply a first fluid to at least one of the first plate interspaces in the at least one plate package and at least one valve is arranged to control the supply of the first fluid to the at least two injectors.

19 Claims, 8 Drawing Sheets

(51) Int. Cl.
| | |
|---|---|
| *F28F 27/02* | (2006.01) |
| *F28D 1/03* | (2006.01) |
| *F28D 9/00* | (2006.01) |
| *B01D 1/22* | (2006.01) |
| *F28D 9/02* | (2006.01) |
| *F28F 9/02* | (2006.01) |
| *F28D 21/00* | (2006.01) |

(52) U.S. Cl.
CPC .......... *F25B 39/028* (2013.01); *F28D 1/0325* (2013.01); *F28D 9/005* (2013.01); *F28D 9/0043* (2013.01); *F28D 9/02* (2013.01); *F28F 9/02* (2013.01); *F28F 9/027* (2013.01); *F28F 9/0273* (2013.01); *F28F 27/02* (2013.01); *F25B 2500/01* (2013.01); *F28D 2021/0071* (2013.01); *F28D 2021/0085* (2013.01); *F28F 9/0268* (2013.01)

(58) Field of Classification Search
USPC .................................................. 165/166, 167
See application file for complete search history.

(56) References Cited

U.S. PATENT DOCUMENTS

| | | | | |
|---|---|---|---|---|
| 5,400,854 | A | | 3/1995 | Iio et al. |
| 5,651,268 | A | * | 7/1997 | Aikawa ................... F28F 9/027 138/44 |
| 5,806,586 | A | * | 9/1998 | Osthues ................ F28F 9/0273 165/153 |
| 5,910,167 | A | * | 6/1999 | Reinke .................. F25B 39/028 165/174 |
| 5,950,715 | A | * | 9/1999 | Jonsson .................. F28D 9/005 165/103 |
| 6,168,765 | B1 | * | 1/2001 | Romatier ............... B01J 19/249 165/166 |
| 6,449,979 | B1 | * | 9/2002 | Nagasawa ............. F28D 1/0391 62/503 |
| 7,086,249 | B2 | * | 8/2006 | Bae ....................... F25B 39/022 165/173 |
| 7,093,649 | B2 | * | 8/2006 | Dawson ................ F28D 9/0031 165/166 |
| 7,331,195 | B2 | * | 2/2008 | Bae ......................... F25B 39/02 165/174 |
| 7,473,404 | B2 | | 1/2009 | Chopard et al. |
| 8,171,987 | B2 | * | 5/2012 | Jiang .................... F25B 39/028 165/174 |
| 8,225,853 | B2 | * | 7/2012 | Macri ................... F25B 39/028 165/174 |
| 9,074,383 | B2 | * | 7/2015 | McQueen ............... E04H 4/129 |
| 2002/0192531 | A1 | | 12/2002 | Zimmerman et al. |
| 2007/0000654 | A1 | | 1/2007 | Matsuzaki et al. |
| 2007/0207372 | A1 | | 9/2007 | Kikuchi et al. |
| 2007/0289318 | A1 | | 12/2007 | Nakamura |
| 2009/0277196 | A1 | * | 11/2009 | Gambiana ............. F25B 39/028 62/115 |
| 2010/0012310 | A1 | * | 1/2010 | Christensen .......... F28D 9/0093 165/260 |
| 2010/0186924 | A1 | * | 7/2010 | Hiyama ................... F01P 7/165 165/10 |
| 2015/0122468 | A1 | | 5/2015 | Bertilsson et al. |
| 2015/0135747 | A1 | | 5/2015 | Bertilsson et al. |
| 2015/0168075 | A1 | | 6/2015 | Bertilsson et al. |

FOREIGN PATENT DOCUMENTS

| | | |
|---|---|---|
| EP | 2 448 051 A1 | 5/2012 |
| GB | 2250336 A | 6/1992 |
| JP | 51-083966 U | 7/1976 |
| JP | 53-109166 U | 9/1978 |
| JP | 08-021666 A | 1/1996 |
| JP | 08-504027 A | 4/1996 |
| JP | 2000-119875 A | 4/2000 |
| JP | 2003-161547 A | 6/2003 |
| JP | 2003-287321 A | 10/2003 |
| JP | 2008-064326 A | 3/2008 |
| JP | 2009222366 A | 10/2009 |
| JP | 2011-079512 A | 4/2011 |
| WO | 94/14021 A1 | 6/1994 |
| WO | WO 94/14021 A1 | 6/1994 |
| WO | WO 00/70292 A1 | 11/2000 |
| WO | WO 2008/000823 A1 | 1/2008 |
| WO | 2008154920 A1 | 12/2008 |
| WO | 2010078722 A1 | 7/2010 |

OTHER PUBLICATIONS

Office Action (Notice of Preliminary Rejection) dated Feb. 15, 2016, by the Korean Intellectual Property Office in corresponding Korean Patent Application No. 10-2015-7000541 (3 pgs).

International Search Report (PCT/ISA/210) dated Oct. 17, 2013, by the European Patent Office as the International Searching Authority for International Application No. PCT/EP2013/061980.

Written Opinion (PCT/ISA/237) dated Oct. 17, 2013, by the European Patent Office as the International Searching Authority for International Application No. PCT/EP2013/061980.

Extended European Search Report and accompanying Opinion dated Nov. 27, 2012 by the European Patent Office in European Application No, 12171914.0 (8 pages).

Office Action (The First Office Action) dated Nov. 2, 2015, by the State Intellectual Property Office of People's Republic China in corresponding Chinese Patent Application No. 201380031239.9, and an English translation of the Office Action. (6 pages).

* cited by examiner

PLATE HEAT EXCHANGER

TECHNICAL FIELD

The present invention refers generally to the fluid supply to a plate heat exchanger.

BACKGROUND ART

The present invention refers generally to a plate heat exchanger, in particular a plate heat exchanger in the form of an evaporator, i.e. a plate heat exchanger designed for evaporation of a fluid, i.e. a cooling agent, in a circuit for various applications, such as air conditioning, cooling systems, heat pump systems, etc.

A plate heat exchanger, typically includes a plate package, with a number of first heat exchanger plates and a number of second heat exchanger plates, which are joined to each other and arranged side by side in such a way that a first plate interspace is formed between each pair of adjacent first heat exchanger plates and second heat exchanger plates and a second plate interspace between each pair of adjacent second heat exchanger plates and first heat exchanger plates. The first plate interspaces and the second plate interspaces are separated from each other and provided side by side in an alternating order in the plate package. Substantially each heat exchanger plate has at least a first porthole and a second porthole, wherein the first portholes form a first inlet channel to the first plate interspaces and the second portholes form a first outlet channel from the first plate interspaces.

The fluid supplied to the inlet channel of such a plate heat exchanger for evaporation is usually present both in a gaseous state and a liquid state. This is known as a two-phase evaporator. It is difficult to provide an optimal distribution of the fluid to the different plate interspaces in such a way that e.g. an optimized quantity of fluid is supplied and flows through each plate interspace. In this general prior art plate heat exchanger the fluid is introduced at one end of the first inlet channel, i.e. the first port hole, for further distribution along the first inlet channel and further into each of the individual first plate interspaces. First of all it is very hard to control the flow inside the first inlet channel. There is always a risk of that the energy content of the inserted fluid is too high, whereby a part of the flow supplied to the inlet channel via its inlet port will meet the rear end of the inlet channel and be reflected thereby in the opposite direction. Thereby the flow in the inlet channel is very chaotic and hard to predict and control. Further, the pressure drop of the fluid increases with the distance from the inlet to the first inlet channel, whereby the distribution of fluid between the individual plate interspaces will be affected. Thereby it is hard to optimize the efficiency of the plate heat exchanger. It is also known that the angular flow change that the droplets of the fluid must undergo when entering the individual plate interspaces from the first inlet channel contributes to a mal distribution.

Further, by each heat exchanger plate being provided with port holes, normally at least two, the available heat transfer surface is reduced. Also, the size and the position of the port holes are structural design parameters that must be considered when designing the surface corrugation of the heat exchanger plates in order to optimize the flow along the plate interspaces. The available acting space for flow optimization is thereby restricted.

Documents WO94/14021, WO00/70292 and WO08/000823 disclose examples of a plate heat exchanger wherein the cooling agent is supplied via an insert extending longitudinally inside and along the first inlet channel for distribution of the fluid into the individual plate interspaces.

Generally the efficiency of a plate heat exchanger at part load is a raising issue for the purpose of reducing the energy consumption. By way of example, laboratory scale trials have shown that a cooling system relating to air-conditioning may save 4-10% of its energy consumption just by improved evaporator function at part load for a given brazed plate heat exchanger. Further, an evaporator system is typically only operating at full capacity for 3% of the time, while most evaporators are designed and tuned for a full capacity operation duty. More focus is put on how the evaporator performs at different operation duties instead of being measured at only one typical operation duty. Also, the market applies so called seasonal efficiency standards. The standards may vary between different states and regions. Typically, such standards are based on a consideration including different working loads, whereby most evaporators are designed and tuned in view of a specific standard. However, during normal operation the work load varies greatly and it hardly reflects the fictive conditions used for the standard.

SUMMARY

The object of the present invention is to provide an improved plate heat exchanger remedying the problems mentioned above. Especially it is aimed at a plate heat exchanger, which allows a better control and distribution of the supply of the first fluid, such as a cooling agent, between the individual plate interspaces to thereby improve the efficiency of the plate heat exchanger. A further object of the invention is to provide a plate heat exchanger, which even allows a reduction of the number and size of the port holes. Another purpose is to allow a reduction of the number heat exchanger plates and also the amount of cooling agent, This object is achieved by a plate heat exchanger including a plate package, which includes a number of first heat exchanger plates and a number of second heat exchanger plates, which are joined to each other and arranged side by side in such a way that a first plate interspace is formed between each pair of adjacent first heat exchanger plates and second heat exchanger plates, and a second plate interspace between each pair of adjacent second heat exchanger plates and first heat exchanger plates, wherein the first plate interspaces and the second plate interspaces are separated from each other and provided side by side in an alternating order in the at least one plate package. The plate heat exchanger is characterized in at least two injectors, each injector being arranged to supply a first fluid to at least one of the first plate interspaces in the at least one plate package and at least one valve arranged to control the supply of the first fluid to the at least two injectors.

In its general form, the use of at least two injectors arranged to supply a first fluid, such as a cooling agent, to at least one of the first plate interspaces is defined. The supply is controlled by at least one valve. Thereby the first fluid can be supplied to the plate heat exchanger at several inlet points, each inlet point corresponding to an injector. Provided each injector is served by its own valve, or one valve serving more than one injector, the fluid supply to the first plate interspace may be easily controlled. Further, the at least one valve allows for an optimization of the fluid supply to each first plate interspace or a group of first plate interspaces. The valves may be controlled individually or as a group by a controller to thereby optimize the flow of the first fluid across the plate heat exchanger based on the required efficiency and the actual performance. This allows for a good control and regulation of the efficiency of the heat exchanger during use depending on the part load.

The position of the injectors may be more or less arbitrary depending on the available space. The injectors may be arranged to direct their supply directly into a plate interspace, whereby the need for any inlet port holes in the heat exchanger plates for the forming of an inlet channel for the first fluid may be eliminated. Further, one and the same first plate interspace may be provided with more than one injector. Alternatively, one and the same injector, or a number of injectors, may be arranged to serve a group of adjacent first plate interspaces, whereby the plate heat exchanger in that case may comprise a plurality of such groups of first plate interspaces. Such injector or such number of injectors may be served by one and the same valve.

Thus, the invention in its most general form provides a wide range of possibilities of how the first fluid may be supplied, and especially in which positions the first fluid is supplied into the plate heat exchanger. The first fluid supply is no longer restricted to take place via the inlet opening of the first inlet channel. This provides for an enlarged available heat transferring surface and new and better possibilities in terms of control and optimization of the flow through the plate heat exchanger.

Substantially each heat exchanger plate may have at least a first porthole, wherein the first portholes form a first inlet channel to the first plate interspaces, wherein the at least two injectors are arranged in the first inlet channel or in a wall portion of the first inlet channel, each injector being arranged to supply a first fluid to more than one of the first plate interspaces. By using more than one injector in the inlet channel, prior art problems relating to travelling distance, pressure drop, droplets, flow direction change, length and shape of tubing upstream of the heat exchanger may be reduced. Also, the injectors may be directed in such way that any change in fluid direction required for the first fluid to enter the first plate interspaces may be reduced or even eliminated.

The first inlet channel may be divided into at least two sections, and the plurality of first plate interspaces may be divided into at least two groups, each group comprising more than one adjacent first plate interspace, and each group being arranged in communication with a section of the first inlet channel, whereby each section of the first inlet channel comprises at least one injector.

By the first inlet channel and the first plate interspaces being divided into groups, each group may be controlled individually allowing better possibilities for an optimization and adaption of the flow to the required part load. It is to be understood that the grouping may be virtual, i.e. without any physical limitation between the groups. Thereby, the groups may be controlled and monitored individually by any controller allowing the flow in, and the operation and performance of each section to be better optimized. The grouping may also be made structural with structural partition walls delimiting at least the first inlet channel. The outlet channel for the first fluid may be continuous.

The at least two injectors may be arranged in an inlet chamber or in a wall portion defining an inlet chamber, the inlet chamber being arranged in communication with at least two of the first plate interspaces in the plate package, each injector being arranged to supply a first fluid to more than one of the first plate interspaces in the plate package.

This enhances the possibility to control the flow of the first fluid through the first plate interspaces in a specific group. The injector or injectors used for one such group may be served by one and the same valve. Thereby a fluid flow may be directed directly into the first plate interspaces without the need for any port holes defining an inlet channel for the first fluid. The inlet chamber may by way of example be in the form of a casing connected to an exterior wall portion of the plate package whereby the inlet chamber is defined by the casing and the exterior wall portion of the plate package. Thus, the port holes which in prior art are required to supply the first fluid may be eliminated. Further, the inlet chamber may be given any desired longitudinal extension depending on the design of the plate package, allowing a better distribution of the first fluid across the first plate interspace. This allows an optimization of the plate heat exchanger in terms of available heat transfer surface and design of the flow pattern. Further, by arranging the injectors in a wall portion of the casing, a freedom is provided regarding position and direction of the injectors in the plate interspace.

The inlet chamber may be divided into at least two sections, and the plurality of first plate interspaces may be divided into at least two groups, each group comprising more than one adjacent first plate interspace, and each group being arranged in communication with a section of the inlet chamber, whereby each section of the inlet chamber may comprise at least one injector.

By the inlet chamber being sectionalized, e.g, by at least one partition wall, and the first plate interspaces being grouped, each group may be controlled individually, allowing better possibilities for an optimization and adaption of the flow to required operation load. In case of operation at part load, some sections and groups may even be closed off.

The at least two injectors may be arranged in one or several rows distributed in the inlet chamber. Alternatively, the at least two injectors may be arranged side by side in at least two rows extending in parallel with the longitudinal extension of the first inlet channel or the inlet chamber. It is to be understood that the injectors may be arranged mutually in a number of ways. By way of example, the at least two injectors may be arranged side by side in a row in parallel with the longitudinal extension of the first inlet channel or the plate package. The at least two injectors may alternatively be arranged side by side in at least two rows in parallel with the longitudinal extension of the first inlet channel or the plate package. Further, the at least two rows of injectors may be arranged on each side of a longitudinal center line of the first inlet channel or the plate package. Additionally, the injectors in a first row may be mutually displaced in view of the injectors in a second row.

Each first plate interspace may comprise an injector, the injectors being arranged in a wall portion defining the respective first plate interspace. This may by way of example be made by a threaded engagement or via a suitable connector arranged to the plate package. In this embodiment the first inlet channel may be eliminated since the first fluid is supplied directly into the individual first plate interspaces. The pressure drop will be low since the fluid flow must not change direction to enter the interspace. It is to be understood that each first plate interspace may be provided with more than one injector, the injectors being arranged in the circumferential exterior envelope surface of the plate package. Thereby the injectors may be oriented in different directions across the major plane of the heat exchanger plates for a better distribution of the fluid across thereof.

The heat exchanger plates in the plate package may be connected to each other through brazing, welding, adhesive or bonding. The connection may be permanent.

Each of the at least two injectors may be arranged in a through hole in a wall portion defining a first plate interspace or a group of communicating first plate interspaces. The through hole may have an extension from the exterior of the plate package to the first plate interspace or to a group of communicating first plate interspaces, the hole being formed by plastic reshaping, by cutting or by drilling. The term plastic reshaping refers to a non-cutting plastic reshaping such as thermal drilling. The cutting or drilling may be made by a cutting tool. It may also be made by laser or plasma cutting.

The at least two injectors may be arranged to direct their supply of the first fluid essentially in parallel with the main plane of the first and the second heat exchanger plates. Thereby any undue re-direction of the flow contributing to pressure drop may be avoided.

Each first plate interspace or each group of communicating first plate interspaces may comprise at least two injectors, each injector being arranged to cooperate with an individual valve. By using individual valves the operation of the plate heat exchanger and its individual first plate interspaces may be controlled with high accuracy.

The at least two injectors may be provided with a nozzle providing a spray pattern, whereby the spray patterns of two adjacent nozzles in one row of injectors or in two adjacent rows of injectors may be set to have an overlap of 10-70%, more preferred 20-60% and most preferred 30-50%.

By the overlap, a substantially even distribution of the first fluid may be provided across the plurality of first plate interspaces, whereby each first plate interspace may be provided with essentially the same amount of first fluid and with essentially with the same inherent energy content and essentially the same density. The overlap is generally to be calculated as seen on the portion of the envelope surface of the first inlet channel subjected to the spray pattern. The overlap compensates for blur along the periphery of the spray pattern due to the spreading of the individual droplets comprised in the sprayed fluid.

The at least one valve may be arranged to cooperate with a controller.

According to another aspect, the invention relates to a heat exchanger plate to be used in plate heat exchanger having the features given above. The heat exchanger plate comprising a heat transfer surface area extending in the general plane of the heat exchanger plate and delimited by a circumferential edge portion, said heat exchanger plate comprising in a corner portion thereof a port hole having a long side and a short side, the long side extending along an edge of the heat exchanger plate, wherein the heat exchanger plate further comprises in its heat transfer surface area at least one first projection extending adjacent and along the long side of the port hole and at least two second projections extending from the short side of the port hole away from the circumferential edge portion.

The at least one first projection, when permanently joining the first heat exchanger plate with a second heat exchanger plate may be arranged to form a sealing off portion along at least a part of the long side of the port hole.

The at least two second projections, when permanently joining the first heat exchanger plate with a second heat exchanger plate, may be arranged to delimit tunnels extending along the general plane of the thus permanently joined first and second heat exchanger plates. The thus formed tunnels contribute to the distribution of a flow of a first fluid in a desired manner towards and across the heat transfer surface area of the heat exchanger plates.

BRIEF DESCRIPTION OF THE DRAWINGS

Embodiments of the invention will now be described, by way of example, with reference to the accompanying schematic drawings, in which FIG. 1 discloses schematically a side view of a typical plate heat exchanger.

DETAILED DESCRIPTION

Figure 1:
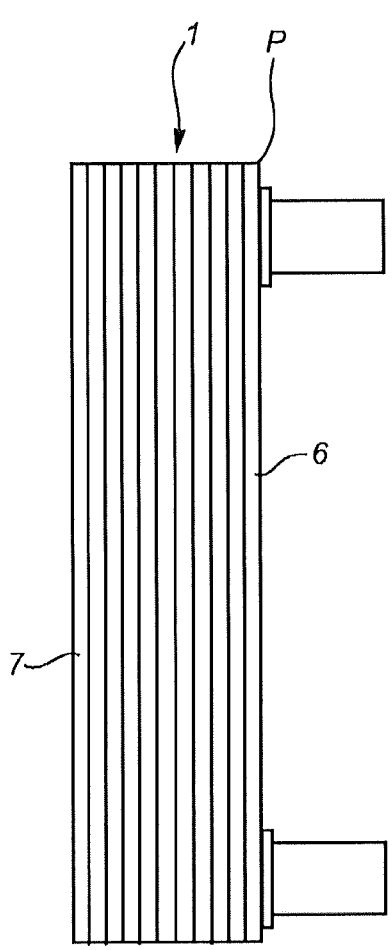
Figure 2:
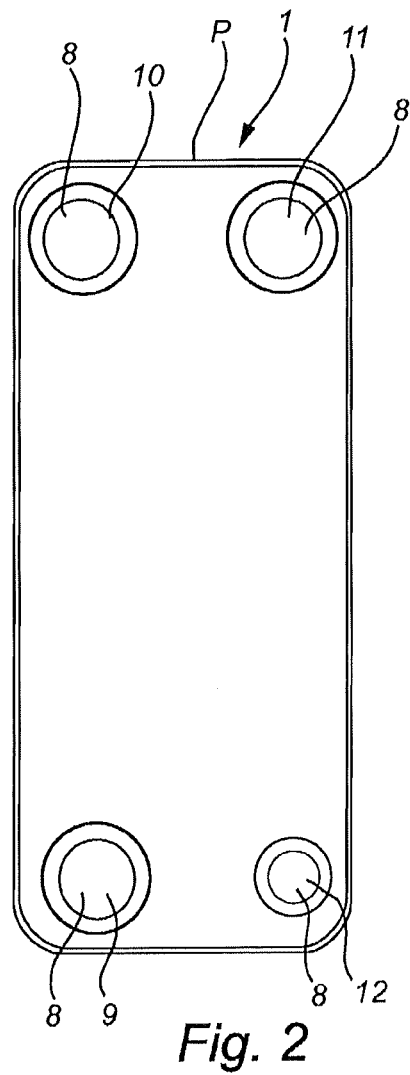
FIG. 2 discloses schematically a front view of the plate heat exchanger in FIG. 1.
Figure 3:
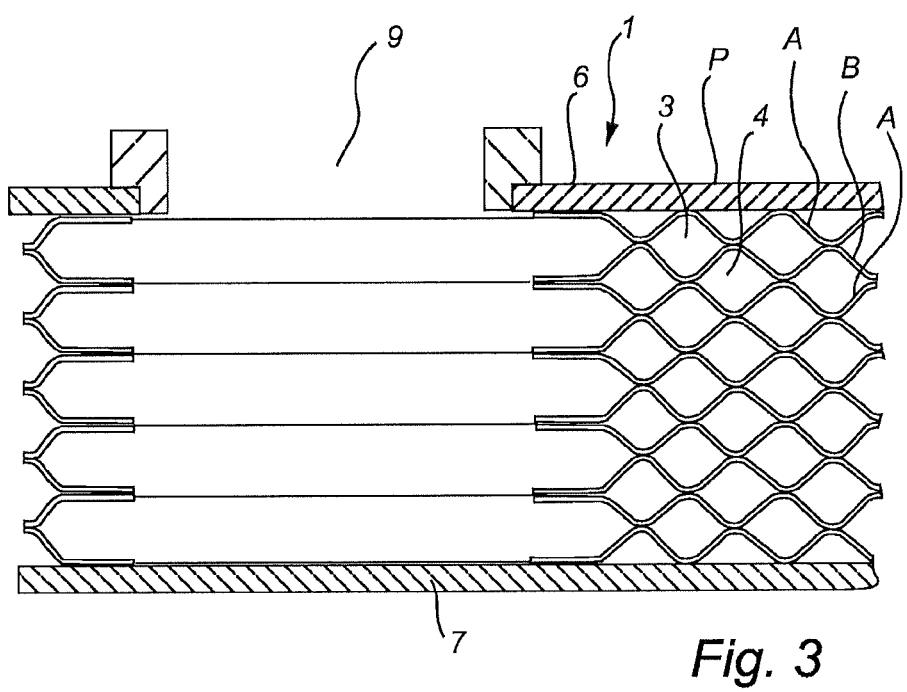
FIG. 3 discloses schematically a cross section of an inlet or outlet channel of a typical plate heat exchanger.

FIGS. 1 to 3 disclose a typical example of a plate heat exchanger 1. The plate heat exchanger 1 includes a plate package P, which is formed by a number of compression molded heat exchanger plates A, B, which are provided side by side of each other. The plate heat exchanger 1 comprises two different types of heat exchanger plates, which in the following are called the first heat exchanger plates A, see FIGS. 3 and 4, and the second heat exchanger plate B, see FIGS. 3 and 5. The plate package P includes substantially the same number of first heat exchanger plates A and second heat exchanger plates B. As is clear from FIG. 3, the heat exchanger plates A, B are provided side by side in such a way that a first plate interspace 3 is formed between each pair of adjacent first heat exchanger plates A and second heat exchanger plates B, and a second plate interspace 4 between each pair of adjacent second heat exchanger plates B and first heat exchanger plates A.

Every second plate interspace thus forms a respective first plate interspace 3 and the remaining plate interspaces form a respective second plate interspace 4, i.e. the first and second plate interspaces 3, 4 are provided in an alternating order in the plate package P. Furthermore, the first and second plate interspaces 3 and 4 are substantially completely separated from each other.

A plate heat exchanger 1 may advantageously be adapted to operate as an evaporator in a cooling agent circuit, not disclosed. In such an evaporator application, the first plate interspaces may form first passages for a first fluid being a cooling agent whereas the second plate interspaces may form second passages for a second fluid, which is adapted to be cooled by the first fluid.

The plate package P also includes an upper end plate 6 and a lower end plate 7, which are provided on a respective side of the plate package P.

In the embodiment disclosed, the heat exchanger plates A, B and the end plates 6, 7 are permanently connected to each other. Such a permanent connection may advantageously be performed through brazing, welding, adhesive or bonding.

Figure 4:
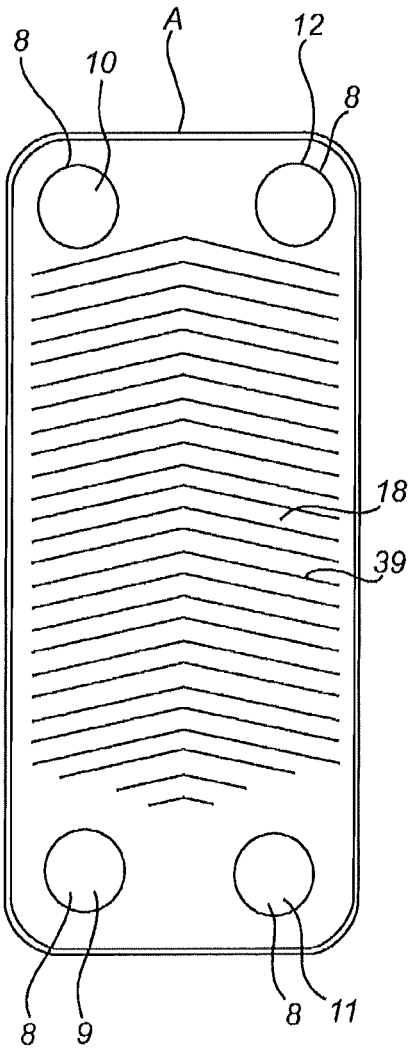
FIG. 4 discloses highly schematic the front side of a typical first heat exchanger plate.
Figure 5:
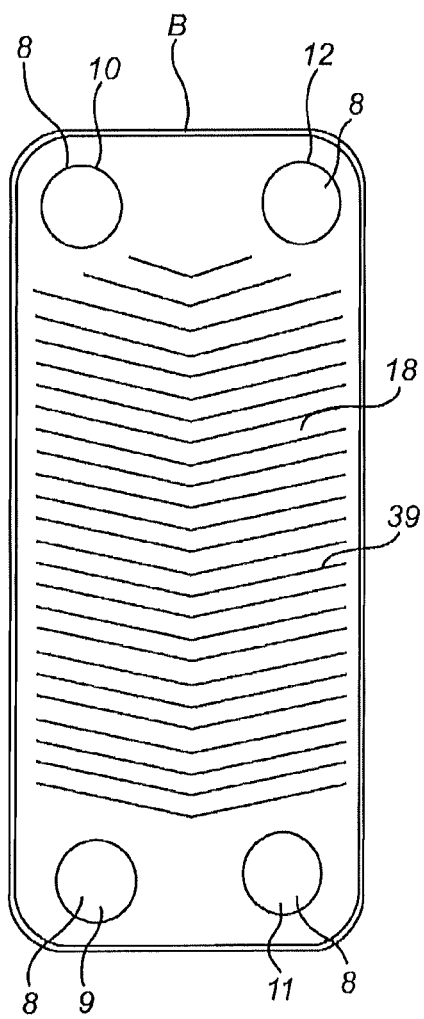
FIG. 5 discloses highly schematic the front side of a typical second heat exchanger plate.

As appears from especially FIGS. 2, 4 and 5, substantially each heat exchanger plate A, B has four portholes 8, namely a first porthole 8, a second porthole 8, a third porthole 8 and a fourth porthole 8. The first portholes 8 form a first inlet channel 9 to the first plate interspaces 3, which extends through substantially the whole plate package P, i.e. all plates A, B and the upper end plate 6. The second portholes 5 form a first outlet channel 10 from the first plate interspaces 3, which also extends through substantially the whole plate package P, i.e. all plates A, B and the upper end plate 6. The third portholes 8 form a second inlet channel 11 to the second plate interspaces 4, and the fourth portholes 8 form a second outlet channel 12 from the second plate interspaces 4. Also these two channels 11 and 12 extend through substantially the whole plate package P, i.e. all plates A, B and the upper end plate 6. The four portholes 8 are in the disclosed embodiment provided in the proximity of a respective corner of the substantially rectangular heat exchanger plates A, B. It is however to be understood that other positions are possible, and the invention should not be limited to the illustrated and disclosed positions.

In a central area of each heat exchanger plate A, B there is an active heat transfer area 18, which is provided with a corrugation 39 of ridges and valleys in a manner known per se. In the embodiment disclosed the corrugations 39 extend in a herringbone-like pattern, wherein the corrugations 39 of the first heat exchanger plates A and the corrugations 39 of the second heat exchanger plates B point in opposite directions. The heat transfer area 18 may of course have other kinds of patterns or even no pattern at all.

Now referring to FIG. 6, one example of the positioning of injectors 25 in view of the first inlet channel 9 will be discussed. In the disclosed embodiment, four injectors 25 are arranged side by side in a row extending in parallel with the longitudinal extension of the first inlet channel 9. The injectors 25 are evenly distributed along the longitudinal extension of the first inlet channel 9 whereby each injector 25 is provided to supply the first fluid to a number of first panel interspaces 3. The injectors 25 are arranged in a wall portion 19 of the first inlet channel 9 by each injector 25 being received in a through hole 20 extending from the exterior circumferential wall portion 13 of the plate package P into the first inlet channel 9.

In the disclosed embodiment the number of injectors 25 is lower than the number of first plate interspaces 3. Thereby each injector 25 is arranged to supply its flow of the first fluid to more than one of the first plate interspaces 3. An even distribution of the fluid inside the first inlet channel 9 is provided by each injector 25 having a nozzle 26 providing a desired spray pattern. It is however to be understood that the number of injectors 25 may correspond to the number of first plate interspaces 3.

The injectors 25 are, as is highly schematically disclosed, connected to valves 29 to control the supply of the first fluid to the injectors 25. Although each injector 25 is disclosed as being connected to one valve 29, it is to be understood that a plurality of injectors 25 may be connected to one and the same valve 29. The valves 29 may be connected to and controlled by a controller. The valves 29 and the controller are preferably arranged outside the plate package P.

It is also to be understood that the plate heat exchanger 1 may be provided with one or several sensors (not disclosed) to provide input to the controller about the operational parameters and operational condition. Typical parameters to monitor are temperature and pressure.

Figure 7:
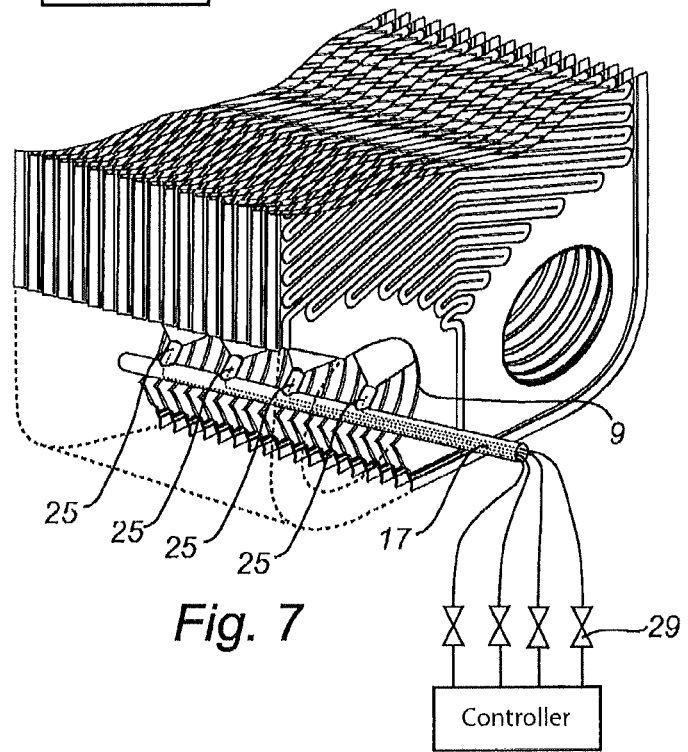
FIG. 7 discloses one embodiment, not forming part of the invention, wherein the individual injectors are arranged on an insert along the interior of the first inlet channel.

As an alternative embodiment, not forming part of the invention, and highly schematically disclosed in FIG. 7, the individual injectors 25 may be arranged along the interior of the first inlet channel 9 by being arranged on an insert 17 received in the first inlet channel 9. Like in the embodiment described above, the injectors 25 may be connected to one or several valves 29. In the disclosed embodiment each injector 25 is connected to one valve 29.

Figure 8:
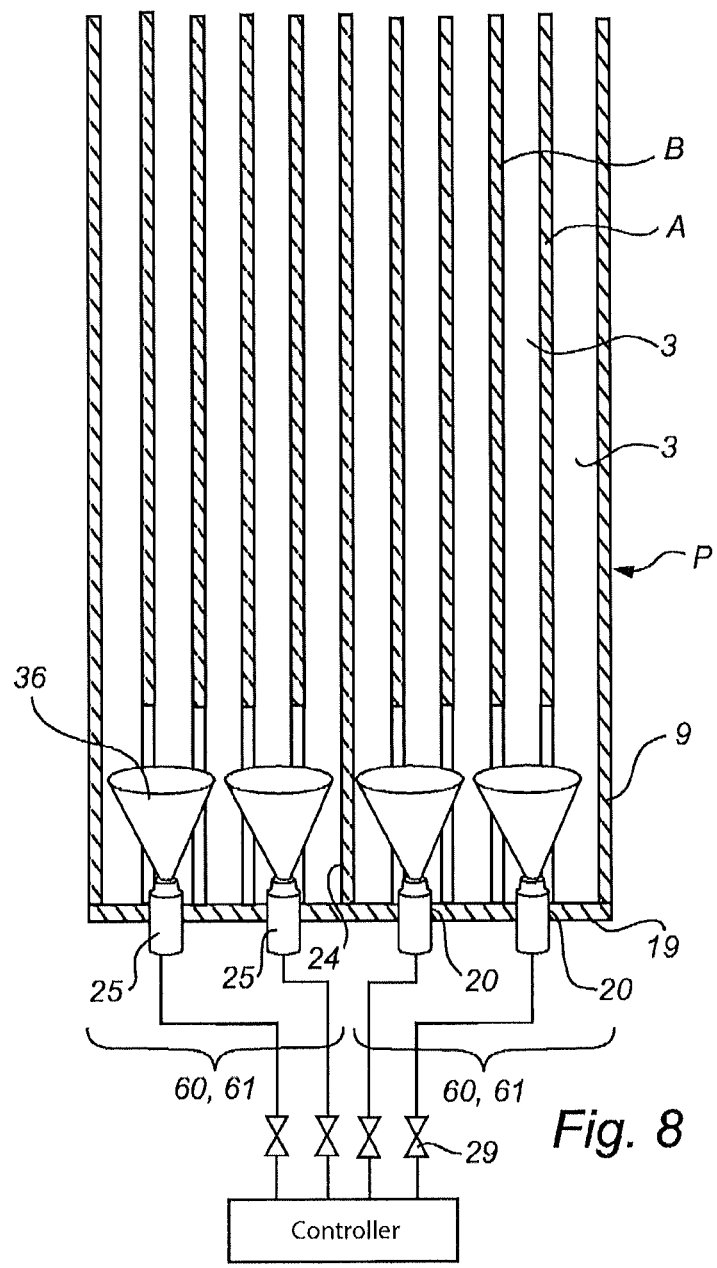
FIG. 8 discloses one highly schematic embodiment in which the first inlet channel is divided into sections and the plurality of injectors divided into groups.

Now turning to FIG. 8, one highly schematic embodiment is disclosed in which the first inlet channel 9 is divided into sections 60 and the plurality of first plate interspaces 3 are divided into groups 61. The disclosed embodiment discloses two sections 60 and two groups 61. Each group 61 of first plate interspaces 3 is arranged in communication with a section 60 of the first inlet channel 9. Each section 60 comprises, in the disclosed embodiment, two injectors 25. The division of the first inlet channel 9 into sections 60 may, as is illustrated, be structural with a partition wall 24 across the first inlet channel 9. The structural sectioning and the grouping of the injectors 25 may be used to be able to close off some sections 60 or groups 61 depending of the required operation load. This may be controlled by the injector 25 or the injectors 25 dedicated to each group 61 of first plate interspaces 3 being closed off by the valves 29 and the controller. In the disclosed embodiment, each injector 25 is connected to one valve 29. Further, the valves 29 are connected to a controller.

Figure 9:
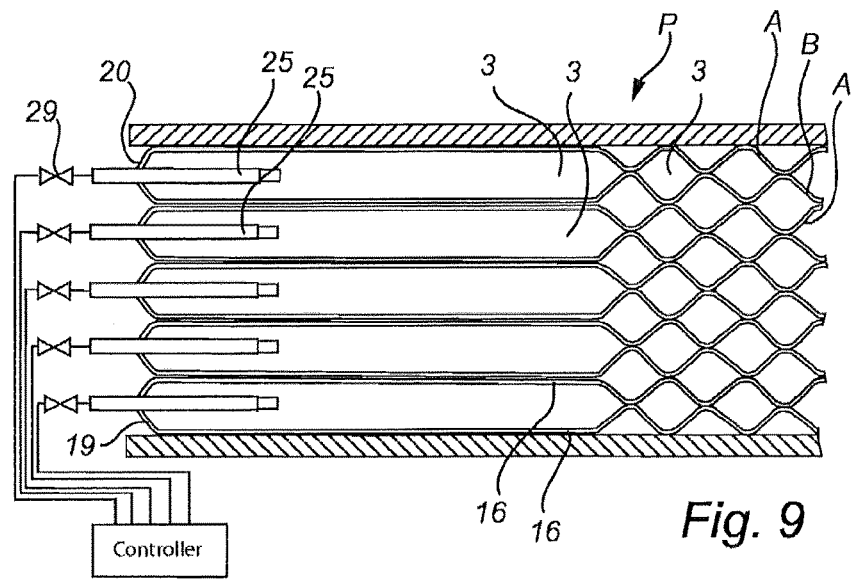
FIG. 9 discloses highly schematic one embodiment wherein injectors are arranged to extend directly into the individual first plate interspaces.

Now turning to FIG. 9, one highly schematic embodiment of a plate package P with a plurality of injectors 25 is disclosed. The first fluid is supplied directly into the first plate interspaces 3 by each first plate interspace 3 comprising an injector 25 arranged in a circumferential wall portion 19 of the plate package P. The respective first plate interspaces 3 are defined by the circumferential wall portion 19 together with the individual heat exchanger plates A, B. The injectors 25 are directed essentially in parallel with the general plane 16 of the first and the second heat exchanger plates A, B. Thereby there will be no major change in flow direction, whereby pressure drops relating to changes in flow direction may be substantially reduced.

It is to be understood that other positions are possible. Also, it is to be understood that each first plate interspace 3 may be provided with more than one injector 25 to provide a better flow distribution across the first plate interspaces 3. The position of the injectors 25 in the plate package P may in fact be more or less arbitrary by each injector 25 being received in a through hole 20 extending from the exterior circumferential wall 19 of the plate package P into a plate interspace 3. This allows a great freedom to the designer of the plate heat exchanger. In fact the first inlet channel 9 may be omitted. It is also to be understood that the through holes may have a diameter providing access to more than one first plate interspace.

Each injector 25 is, as is highly schematically disclosed, connected to one valve 29. The valves 29 are arranged to control the supply of the first fluid to the injectors 25. It is to be understood that a plurality of injectors 25 may be connected to and controlled by one single valve 29. The valves 29 may be controlled by a controller. It is also to be understood that the plate heat exchanger 1 as such may be provided with one or several sensors (not disclosed) to provide input to the controller about the operational parameters and operational condition. Typical parameters to monitor are temperature and pressure.

Figure 10:
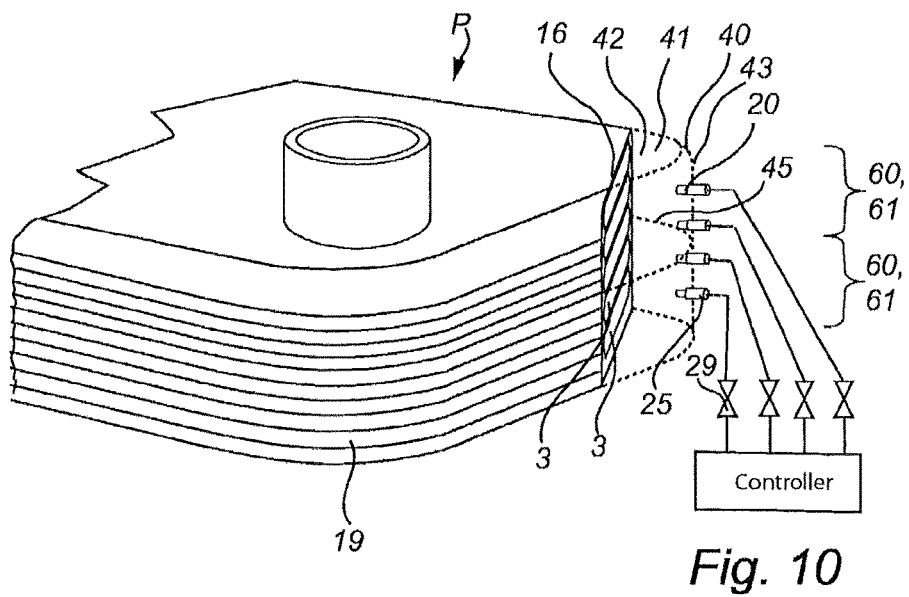
FIG. 10 discloses one embodiment of a plate package wherein the first fluid channel has been replaced by a inlet chamber extending along one peripheral side of the plate package.

Now turning to FIG. 10, another embodiment of a plate package P is disclosed highly schematically. The first inlet channel has been replaced by a inlet chamber 41 extending along one peripheral side of the plate package P. In the disclosed embodiment, the inlet chamber 41 is defined by a casing 40 connected to a portion of the plate package P, such as a corner portion, to thereby define a through channel 42 between the plate package P and the casing 40. The inlet chamber 41 thus created is communicating with each of the first plate interspaces 3. The casing 40 may be permanently connected to the plate package P or detachable thereto. The inlet chamber 41 may extend along any portion of the plate package P.

In the disclosed embodiment, four injectors 25 are arranged in the inlet chamber 41 and each injector 25 is arranged to supply a first fluid to each or more than one of the first plate interspaces 3. The injectors 25 are received in through holes 20 in a wall portion 43 of the casing 40. The through holes 20 extend from the exterior of the casing 40 to the interior of the inlet chamber 41. The injectors 25 may also (not disclosed) be arranged in the interior of the inlet chamber 41. The injectors 25 may be arranged in one or several rows distributed in or along the inlet chamber 41. Each injector 25 may direct its flow of the first fluid essentially in parallel with the general plane 16 of the first and the second heat exchanger plates 3, 4. Thereby any undue changes in flow direction of droplets of the first fluid are reduced or even eliminated and thereby unnecessary pressure drops.

Each injector 25 may, as highly schematically disclosed, be connected to one valve 29. The valves 29 may be arranged to control the supply of the first fluid to the injectors 25. It is to be understood that a number of injectors 25 may be connected to one and the same valve 29. The valves 29 may be controlled by a controller. It is also to be understood that the plate heat exchanger 1 as such may be provided with one or several sensors (not disclosed) to provide input to the controller about the operational parameters and operational condition. Typical parameters to monitor are temperature and pressure.

The inlet chamber 41 may be divided into sections 60 by one or several partition walls 45. Each section comprises in the disclosed embodiment two injectors 25, the two injectors 25 forming one group 61 of injectors.

Figure 11:
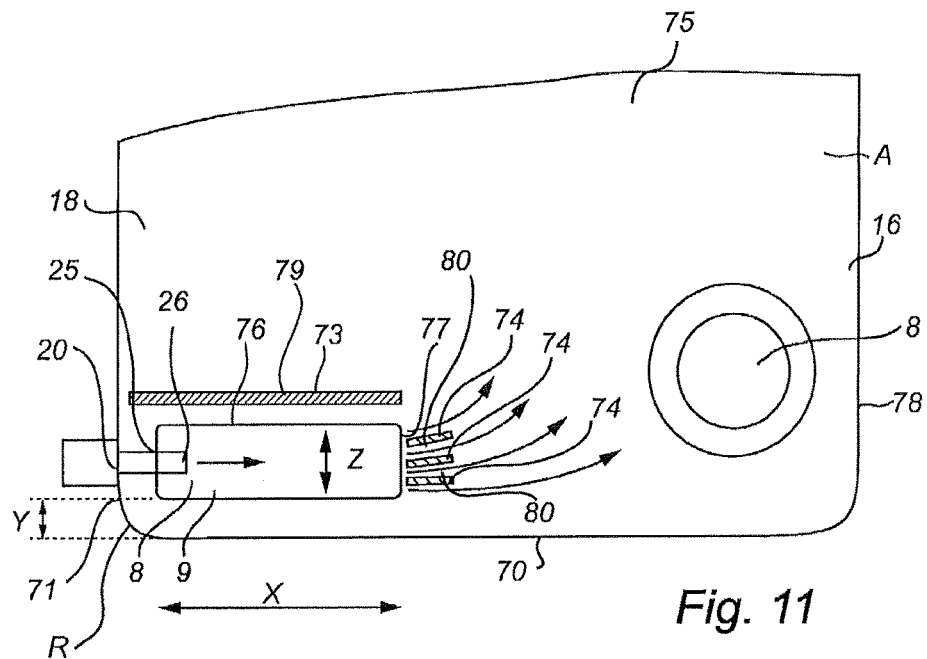
FIG. 11 discloses schematically a portion of a heat exchanger plate with a rectangular inlet port.
Figure 12:
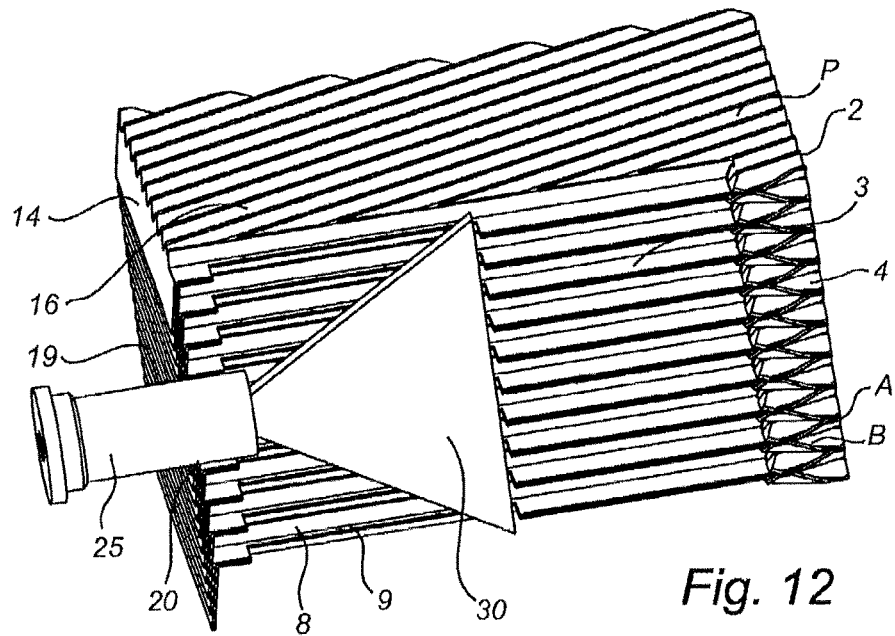
FIG. 12 discloses schematically a portion of a plate package with a rectangular inlet channel.

Now turning to FIGS. 11 and 12, one embodiment of a heat exchanger plate A and a plate package P formed thereby are disclosed. Although a heat exchanger may comprise more than one type of heat exchanger plates, only one type is disclosed. The plate package P comprises a stack 2 of first and second heat exchanger plates A, B arranged side by side in such a way that a first plate interspace 3 is formed between each pair of adjacent first heat exchanger plates A and second heat exchanger plates B and a second plate interspace 4 between each pair of adjacent second heat exchanger plates B and first heat exchanger plates A. The first plate interspaces 3 and the second plate interspaces 4 are separated from each other and provided side by side in an alternating order in the plate package P. Substantially each heat exchanger plate A has at least a first porthole 8 and a second porthole (not disclosed), wherein the first portholes 8 form a first inlet channel 9 to the first plate interspaces 3 and the second portholes form a first outlet channel (not disclosed) from the first plate interspaces 3. Each heat exchanger plate A has a peripheral, circumferential bent flange 14 along its circumferential edge portion 78 having an angle in view of the general plane 16 of the first and second heat exchanger plates (A, B). The flanges 14 are used as connecting surfaces when joining the individual heat exchanger plates A, B to form the stack 2. The heat exchanger plates A, B are preferably permanently joined to each other, e.g. by brazing, welding, adhesive or bonding.

The port hole 8 forming the first inlet channel 9 is arranged in a lower corner portion 71. In the disclosed embodiment, the through hole 8 has an essentially rectangular shape having a long side 76 and a short side 77, however it is to be understood that other geometries are possible. The essentially rectangular port hole 8 has a length X extending along the long side 76 and a height Z extending along the short side 77. The long side 76 extends along one edge of the heat exchanger plate, in the disclosed embodiment along a shorter, lower edge 70 of the heat exchanger plate A. The essentially rectangular shape together with the position in the lower end corner portion 71 allows a minimization of the cut away material of the heat exchanger plate A which in turn allows a larger heat transfer area 18 of the heat exchanger plate A. Further, the port hole 8 is arranged on a distance Y from the lower edge 70 of the heat exchanger plate A. The distance Y should preferably be kept as small as possible to utilize as large portion as possible of the heat exchanger plate A for heat transfer.

The heat exchanger plate A comprises in its panel surface 75 at least one first projection 73 extending adjacent and along the long side 76 of the longitudinal port hole 8 and at least two second projections 74 extending from the short side 77 of the port hole 8 away from the circumferential edge portion 78. When permanently joining the first heat exchanger plate A with a second heat exchanger plate B the at least one first projection 73 is arranged to form a sealing off portion 79 along the long side 76 of the port hole 8.

The at least two second projections 74 extending from the short side 77 of the port hole 8 away from the circumferential edge portion 78 are arranged to, when permanently joining the first heat exchanger plate A with a second heat exchanger plate B, delimit tunnels 80 extending along the general plane 16 of the thus permanently joined heat exchanger plates A, B. The thus formed tunnels 80 are arranged to distribute a flow of a first fluid in a desired manner towards and across the heat transfer surface area 18 of the heat exchanger plates A, B. A typical flow is highly schematically illustrated by arrows.

The first and second projections 73, 74 may be pressed geometries or they may be material arranged thereto for the purpose of building a projection allowing permanently joining of the first and a second heat exchanger plates A, B. Examples of such material is welding material, brazing material, adhesive etc.

When a plurality of thus formed heat exchanger plates A, B are stacked and individually joined to form a plate package P, the rectangular port holes 8 will together define a first inlet channel 9 extending in one direction along the thus formed plate package P.

The circumferential exterior wall portion 13 of the plate package P thus formed by the flanges 14 of the individual heat exchanger plates A, B is provided with at least one through hole 20. The through hole 20 has a longitudinal center axis preferably extending in parallel with the general plane 16 of the heat exchanger plates.

Each through hole 20 is arranged to receive an injector 25 with a nozzle 26. The nozzle 26 may be arranged to provide an essentially fan shaped spray pattern 30 allowing distribution of a first fluid into the first inlet channel 9 and into a plurality of first plate interspaces 3. It is preferred to arrange a row of injectors 25 along the longitudinal extension of the first inlet channel 9. Like previous embodiments discussed above, each injector 25 may be connected to one valve (not disclosed). Also, like previous embodiments, a plurality of such valves may be connected to a controller (not disclosed).

It is preferred that the length X of the porthole 8 is adapted together with the spray angle of the injector 25 and its nozzle 26 to allow a spray pattern to cover the required number of plate interspaces 3 in the plate package P. It is preferred that the width Z of the rectangular port hole 8 is made narrow, yet allowing a fluid distribution between the tunnels 80.

It is preferred that the radius R of the corresponding lower end corner 71 of the heat exchanger plate A is made as small as possible to allow the port hole 8 and its through hole 20 to be positioned as low as possible on the heat exchanger plate P to thereby utilize as large portion as possible of the heat exchanger plate for heat transfer.

As a non-limiting example, the heat exchanger plate A, B may be provided with a port hole 8 having the following dimensions: X 35 mm. Z 12 mm, Y 8 mm. Further, the radius of the corresponding corner portion 71 of the heat exchanger plate A may be 5 mm. It is however to be understood that the dimensions are depending on the over-all size of the heat exchanger plates.

Generally, no matter embodiment, the injectors 25 are arranged in through holes 20 having an extension from the exterior of the plate package P to the first inlet channel 9 or to the inlet chamber 41. The through holes 20 may be formed by plastic reshaping, by cutting or by drilling. The term plastic reshaping refers to a non-cutting plastic reshaping such as thermal drilling. Thermal drilling is also known as known as flow drilling, friction drilling or form drilling. The cutting or drilling may be made by a cutting tool. It may also be made by laser or plasma cutting.

In the disclosed embodiments each injector 25 supply a flow of the first fluid to one single or to a plurality of first plate interspaces 3. In the following a number of different patterns of the injectors 25 will be exemplified.

Figure 6:
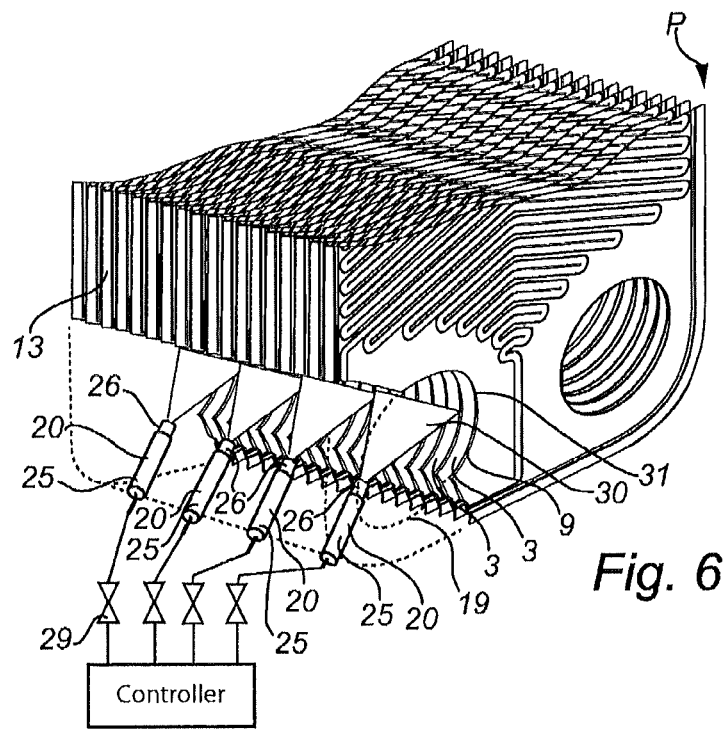
FIG. 6 discloses one example of the positioning of the injectors in view of the first inlet channel.
Figure 13:
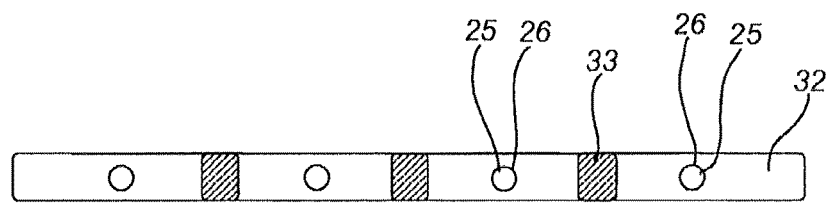
FIG. 13 discloses schematically a spray pattern providing an essentially rectangular projected area.
Figure 14:
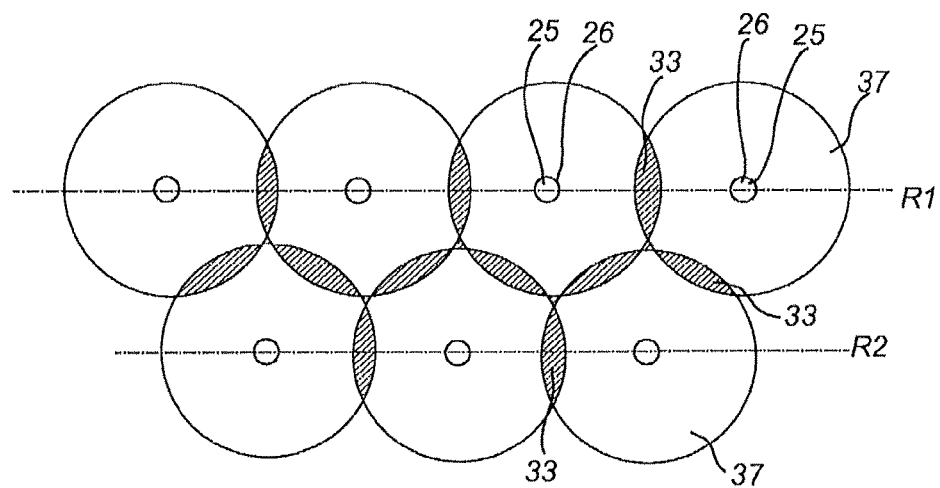
FIG. 14 discloses schematically a spray pattern providing an essentially rectangular projected area.

The injectors 25 may be provided with nozzles 26 providing a fan shaped spray pattern 30, see FIG. 6. Thus, the resulting spray pattern, see FIG. 13 when projected on a surface, such as the inner envelope wall 31 of the first inlet channel 9, is an essentially rectangular projected area 32. The injectors 25 may be arranged with such mutual interspace along the first inlet channel 9 and with such distance to an inner envelope wall 31 of the inlet channel 9 that the spray patterns of two adjacent nozzles 26 provide an overlap 33. By the overlap 33, a substantially even distribution of the first fluid may be provided across a plurality of first plate interspaces 3. Generally, the purpose of an overlapping spray pattern is to compensate for blur along the periphery of the spray pattern due to the spreading of the individual droplets comprised in ejected fluid. The overlap 33 may be set to be in the range of 10-70%, more preferred 20-60% and most As illustrated in FIG. 14, another embodiment is disclosed wherein the injectors 25 are arranged side by side in two rows R1, R2. The disclosed spray pattern is the result of injectors 25 provided with nozzles 26, each providing an essentially cone shaped spray pattern 36, see FIG. 8, whereby the resulting projected area will be circles 37. Although two rows R1, R2 are disclosed, it is to be understood that more than two rows R1, R2 are applicable, or only one row R1; R2. In the disclosed embodiment, the injectors 25 in the first row R1 are disclosed as being mutually displaced in view of the injectors in the second row R2. Further, the projected spray pattern is provided with an overlap 33.

In the embodiments disclosed, the at least two injectors 25 are arranged in the first inlet channel 9 to direct a flow of fluid to the first plate interspaces 3 via a part of the inner envelope surface 31 of the first inlet channel 9 as seen in a cross section of the envelope surface transverse the longitudinal extension of the first inlet channel 9. The portion selected depends on a number of factors such as the provision of and the position of any distributors adjacent the first inlet channel, the pressure of the supplied first fluid and any surface pattern in the individual heat exchanger plates. The flow of the first fluid may by way of example be directed to the lower portion of the first fluid channel, whereby the first fluid when entering the first plate interspaces may be distributed across essentially the full heat transferring surface of the heat exchanger plates. Still, it is to be understood that this is only one, non-limiting example. It is also to be understood that one row of injectors may be directed to cover one portion of the cross section of the envelope surface, whereas another row of injectors may be directed to cover another portion of the cross section of the envelope surface.

It is to be understood that the at least two injectors 25 may be arranged to direct the supply of the first fluid in any arbitrary direction within the first inlet channel 9, within the inlet chamber or within a first plate interspace 3. However, it is preferred that the flow is directed essentially in a direction in parallel with the general plane 16 of the first and the second heat exchanger plates A, B. The invention has been illustrated and disclosed throughout this document with the port holes 8 and thereby also the first inlet channel 9 arranged in the corners of rectangular heat exchanger plates A, B. It is however to be understood that also other geometries and positions are possible within the scope of protection. Also, the port holes 8 have been illustrated and disclosed as circular or rectangular holes. It is to be understood that also other geometries are possible within the scope of the protection.

It is to be understood that the invention is applicable also to plate heat exchangers of the type (not disclosed) where a plate package is kept together by tie-bolts extending through the heat exchanger plates and the upper and lower end plates. In the latter case gaskets may be used between the heat exchanger plates. The invention is also applicable to plate heat exchangers comprising pair-wise permanently joined heat exchanger plates, wherein each pair forms a cassette. In such solution gaskets may be arranged between each cassette.

The invention is not limited to the embodiment disclosed but may be varied and modified within the scope of the following claims, which partly has been described above.

The invention claimed is:

1. A plate heat exchanger including a plate package, which includes a number of first heat exchanger plates and a number of second heat exchanger plates lying in respective planes parallel to one another, which are joined to each other and arranged side by side in a side-by-side direction in such a way that a first plate interspace is formed between each pair of adjacent first heat exchanger plates and second heat exchanger plates, and a second plate interspace between each pair of adjacent second heat exchanger plates and first heat exchanger plates, wherein the first plate interspaces and the second plate interspaces are separated from each other and provided side by side in an alternating order in the at least one plate package, the plate package including either an inlet channel communicating with the first plate interspaces or an inlet chamber communicating with the first plate interspaces, at least two injectors spaced apart from one another in the side-by-side direction, each injector being arranged to supply a first fluid to at least one of the first plate interspaces in the at least one plate package, the at least two injectors being arranged in respective through holes in a wall portion defining one of the first plate interspaces or a group of communicating first plate interspaces,
each of the at least two injectors facing towards the first and second heat exchanger plates that form the one first interspace to direct the first fluid in a direction parallel to the respective planes of the first and second heat exchanger plates,
the through hole for each of the two injectors extending from the exterior of the plate package to the inlet channel or the inlet chamber, and the through hole being formed by plastic reshaping,
and at least one valve arranged to control the supply of the first fluid to the at least two injectors.

2. A plate heat exchanger according to claim 1, wherein each heat exchanger plate has at least a first porthole, wherein the first portholes form the inlet channel to the first plate interspaces, the inlet channel being a first inlet channel, the at least two injectors being arranged in the first inlet channel or in a wall portion of the first inlet channel, each injector being arranged to supply the first fluid to more than one of the first plate interspaces.

3. A plate heat exchanger according to claim 2, wherein the first inlet channel is divided into at least two sections, and the plurality of first plate interspaces are divided into at least two groups, each group comprising more than one adjacent first plate interspace, and each group being arranged in communication with a section of the first inlet channel, whereby each section of the first inlet channel comprises at least one injector.

4. A plate heat exchanger according to claim 1, wherein the at least two injectors are arranged in the inlet chamber or in a wall portion defining the inlet chamber, each injector being arranged to supply the first fluid to more than one of the first plate interspaces in the plate package.

5. A plate heat exchanger according to claim 4, wherein the inlet chamber is divided into at least two sections, and the plurality of first plate interspaces are divided into at least two groups, each group comprising more than one adjacent first plate interspace, and each group being arranged in communication with a section of the inlet chamber, whereby each section of the inlet chamber comprises at least one injector.

6. A plate heat exchanger according to claim 4, wherein the at least two injectors are arranged in one or several rows.

7. A plate heat exchanger according to claim 2, wherein the at least two injectors are arranged side by side in at least two rows extending in parallel with the longitudinal extension of the first inlet channel.

8. A plate heat exchanger according to claim 1, wherein each first plate interspace comprises an injector, the injectors being arranged in a wall portion defining the respective first plate interspace.

9. A plate heat exchanger according to claim 1, wherein the heat exchanger plates in the plate package are connected to each other through brazing, welding, adhesive or bonding.

10. A plate heat exchanger according to claim 1, wherein the at least two injectors are arranged to direct their supply of the first fluid in parallel with the general plane of the first and the second heat exchanger plates.

11. A plate heat exchanger according to claim 1, wherein each first plate interspace or each group of communicating first plate interspaces comprises at least two injectors, each injector being arranged to cooperate with an individual valve.

12. A plate heat exchanger according to claim 1, wherein the at least two injectors are provided with a nozzle, whereby the spray patterns of two adjacent nozzles in one row of injectors or in two adjacent rows of injectors are set to have an overlap of 10-70%.

13. A plate heat exchanger according to claim 1, wherein the at least one valve is arranged to cooperate with a controller.

14. A heat exchanger plate to be used in plate heat exchanger according to claim 1, comprising:
a heat transfer surface area extending in the general plane of the heat exchanger plate and delimited by a circumferential edge portion, said heat exchanger plate comprising in a corner portion thereof a port hole having a long side and a short side, the long side extending along an edge of the heat exchanger plate, wherein the heat exchanger plate further comprises in its heat transfer surface area at least one first projection extending adjacent and along the long side of the port hole and at least two second projections extending from the short side of the port hole away from the circumferential edge portion.

15. The heat exchanger plate according to claim 14, wherein the at least one first projection, when permanently joining the first heat exchanger plate with a second heat exchanger plate is arranged to form a sealing off portion along at least a part of the long side of the port hole.

16. The heat exchanger plate according to claim 15, wherein the at least two second projections, when permanently joining the first heat exchanger plate with a second heat exchanger plate is arranged to delimit tunnels extending along the general plane of the thus permanently joined first and second heat exchanger plates.

17. A plate heat exchanger according to claim 4, wherein the at least two injectors are arranged side by side in at least two rows extending in parallel with the longitudinal extension of the inlet chamber.

18. A plate heat exchanger according to claim 1, wherein the at least two injectors are provided with a nozzle, whereby the spray patterns of two adjacent nozzles in one row of injectors or in two adjacent rows of injectors are set to have an overlap of 20-60%.

19. A plate heat exchanger according to claim 1, wherein the at least two injectors are provided with a nozzle, whereby the spray patterns of two adjacent nozzles in one row of injectors or in two adjacent rows of injectors are set to have an overlap of 30-50%.

* * * * *

UNITED STATES PATENT AND TRADEMARK OFFICE
CERTIFICATE OF CORRECTION

PATENT NO. : 10,107,572 B2
APPLICATION NO. : 14/407542
DATED : October 23, 2018
INVENTOR(S) : Klas Bertilsson et al.

It is certified that error appears in the above-identified patent and that said Letters Patent is hereby corrected as shown below:

On the Title Page

Column 1, (71), change "(CH)" to -- (SE) --;
        (72), change "(CH)" all occurrences to -- (SE) --.

Signed and Sealed this
Twenty-fifth Day of December, 2018

Andrei Iancu
*Director of the United States Patent and Trademark Office*